United States Patent Office 3,705,232
Patented Dec. 5, 1972

3,705,232
PROCESS FOR THE MANUFACTURE OF ALKALI METAL POLYPHOSPHATES
Fritz Krahl, Efferen, near Cologne, Dieter Hammel, Ladenburg, Gero Heymer, Knapsack, near Cologne, and Heinz Harnisch, Lovenich, near Cologne, Germany, assignors to Knapsack Aktiengesellschaft, Knapsack, near Cologne, Germany
No Drawing. Filed May 5, 1969, Ser. No. 822,006
Claims priority, application Germany, May 16, 1968, P 17 67 500.2
Int. Cl. C01b 25/28, 25/30
U.S. Cl. 423—312            5 Claims

ABSTRACT OF THE DISCLOSURE

Production of alkali metal polyphosphates from elementary phosphorus, and alkali metal hydroxide or alkali metal carbonate, which may be used solid and/or dissolved, and a free oxygen-containing gas. The alkali metal hydroxide or the alkali metal carbonate is atomized in a reaction zone, directly into or in the immediate vicinity of a flame produced by burning liquid phosphorus, molten reaction product is removed from the reaction zone, gas issuing from the reaction zone is supplied to a gas scrubbing zone, and aqueous scrubbing solution is recycled to the reaction zone. The aqueous scrubbing solution is freed, prior to recycling it to the reaction zone, from arsenic contained in the volatile issuing gas by treatment with an alkali metal sulfide or hydrogen sulfide, and recycled to the reaction zone in a quantity sufficient to produce therein a steam partial pressure of more than 450 mm. mercury.

The present invention relates to a process for the manufacture of alkali metal polyphosphates from elementary phosphorus, an alkali metal hydroxide or alkali metal carbonate, which may be used in solid and/or dissolved form, and a free oxygen-containing gas, which comprises atomizing the alkali metal hydroxide or the alkali metal carbonate in a reaction zone, preferably lined with graphite, directly into or in the immediate vicinity of a flame produced by burning liquid phosphorus; removing molten reaction product from the reaction zone; supplying the gas issuing from the reaction zone to a gas scrubbing zone; and recycling the aqueous scrubbing solution obtained in the scrubbing zone to the reaction zone, the aqueous scrubbing solution being freed, prior to recycling it to the reaction zone, from arsenic which is contained in the volatile issuing gas, by treatment with an alkali metal sulfide or hydrogen sulfide.

Phosphorus produced from crude phosphate by electrothermal treatment generally contains arsenic in proportions varying within certain limits. On subjecting the phosphorus so produced to finishing treatment, for example into phosphoric acid salts, the arsenic is found to contaminate the secondary products derived therefrom, of which the uses may be considerably limited thereby.

It is known that phosphorus compounds substantially free from arsenic can be produced from thermally processed phosphoric acid which is preferred today and freed from arsenic which is precipitated as $As_2S_3$, by treatment with $Na_2S$, prior to subjecting it to finishing treatment. This is not possible, however, in those cases in which the phosphorus compounds are directly produced from elementary phosphorus, while omitting the intermediary phosphoric acid stage. This is more particularly the case, for example in the production of polyphosphates from phosphorus, oxygen and alkali metal or alkaline earth metal compounds.

In these processes, elementary phosphorus, hydroxides or salts of the alkali metal or alkaline earth metals, which have a volatile anion therein, and air are transformed into polyphosphates by a single process step. The phosphorus is burned near the head of a reaction tower by atomizing it through a nozzle which can simultaneously be used for atomizing the alkali metal or alkaline earth metal compounds into the phosphorus flame, using compressed air. The resulting melt is removed near the base of the graphite-lined tower, and quenched. The gas issuing from the reaction tower carries about 40% of the reaction product down to the scrubbing zone, which is arranged downstream of the reaction tower and fed with sodium phosphate solution circulating therein. The strong phosphorus combustion heat enables the scrubbing solution, from which the arsenic can be separated in sulfide form, to be recycled to the combustion tower, of which the walls are gas-cooled.

A rather serious disadvantage of these processes resides in the partially very high content of arsenic in the melt phosphate, which restricts the use thereof to substantially technical applications. While the arsenic content of the final product can be appreciably reduced by dearsenification of the scrubbing solution given that elementary phosphorus and alkali metal or alkaline earth metal chlorides are the feed material—in this case it is readily possible to precipitate the arsenic in sulfide form from hydrochloric acid scrubbing solution—the fact remains that the content of arsenic in the final product is only slightly reduced when elementary phosphorus and hydroxides or carbonates are used for the production of neutral or alkaline short chain melt phosphates, The reason for this is that the issuing gas flowing down to the wet scrubbing zone merely contains small amounts of arsenic.

The object of the present process for making alkali metal polyphosphates from elementary phosphorus, oxygen and alkali metal hydroxides or carbonates is to reduce the content of arsenic in the final product. It has unexpectedly been found that the proportion of arsenic which escapes together with the issuing gas can be influenced. To this end, it is necessary in the process first reported above to recycle to the reaction zone a quantity of scrubbing solution sufficient to produce therein a steam partial pressure of more than 450 mm. mercury, preferably more than 480 mm. mercury.

The alkali metal polyphosphates contained in the scrubbing solution are preferably hydrolyzed prior to precipitating the arsenic contained therein by treatment with $Na_2S$. The hydrolysis is effected by allowing the scrubbing solution to stand for at least 60 minutes at about 80° C. a pH value of ≤3.

The scrubbing solution should conveniently be used in combination with more than 5 times the quantity of sulfide theoretically needed for precipitating the arsenic.

Prior to adding the alkali metal sulfide or hydrogen sulfide, a pH-value <3 should preferably be established for the scrubbing solution by means of an acid, which preferably is a phosphoric acid produced from thermally processed phosphorus.

In order to separate the arsenic fairly extensively, the scrubbing solution with the precipitating agent therein should be allowed to stand for more than 1 hour, preferably 1.5 hours, prior to filtering off the precipitate.

The melt coming from the reaction zone generally contains 60 to 65 weight percent of the feed phosphorus in the form of $(NaPO_3)_x$ but merely 65 to 30 weight percent of the arsenic initially contained in the elementary phosphorus; this depends on the steam partial pressure prevailing in the reaction zone. The remaining 35 to 70 weight percent arsenic together with about 35 to 40 weight percent of the feed phosphorus are retained in the scrubbing solution; the proportion of volatile arsenic increases within the limits specified above as the steam partial pressure in the reaction zone increases. In order fairly extensively to reduce the content of arsenic in the final product, all of the reaction heat to be dissipated from the reactor is used in the present process for recycling and evaporating the scrubbing solution, from which the arsenic is precipitated earlier, in the form of arsenic sulfide. The advantage offered thereby resides in the fact that the graphite wall need no longer be cooled using gas fairly free from oxygen, which is so expensive, and in the fact that the temperature prevailing in the reactor can be controlled just with the use of the scrubbing solution to be atomized.

It is known that arsenic is difficult to precipitate as sulfide in a weakly acid solution and that the precipitation is not quantitative because of the tendency of $As_2S_3$ to form a colloidal solution merely in a weakly acid medium. The scrubbing solution obtained in the process of the present invention has a temperature of 70 to 80° C. and contains about 375 grams/liter solid matter. In view of the fact that the $P_2O_5/Me_2O$-ratio in the solids carried along with the issuing gas is modified favoring the acid proportion therein—this is occasioned by the more volatile $P_2O_5$—a pH-value between 2 and 3 is found to establish in the scrubbing solution. A substantially quantitative separation of the arsenic from this solution is only possible under quite specific precipitation conditions which must be adhered to. The basic prerequisite for achieving this is to hydrolyze the melt phosphate dissolved in the scrubbing solution. Failing this, the treatment by means of the $Na_2S$-solution does not affect precipitation of the arsenic in the polyphosphate chain. It is accordingly necessary, prior to the $Na_2S$-addition, to allow the scrubbing solution to stand for a period of time sufficient to produce quantitative hydrolysis of the As—O—P bonds. Under the conditions specified (about 80° C., pH 2–3), the hydrolysis normally needs 1 to 1.5 hours to proceed. Further critical factors are the time which is allowed to lapse between precipitation and filtration, and the excess of $Na_2S$ used. More than 90% of the arsenic in the scrubbing solution can be precipitated with the proviso that an at least 1 hour period is allowed to lapse between precipitation and filtration, and that the sulfide is used in an excess which is at least 5 times the quantity of sulfide theoretically neded for precipitating the arsenic. When the pH-value of the scrubbing solution increases to a value higher than 3—this occurs more particularly in the production of polyphosphates with a chain length <7—then the scrubbing solution should advantageously be used in combination with an acid, which is preferably thermal phosphoric acid. This enables the arsenic to be separated subsequently.

EXAMPLE

A nozzle disposed near the head of a reaction tower lined wtih graphite bricks was used to atomize and burn 325 kg./hr. liquid phosphorus using 1800 cubic meters/hr. air, and 535 kg./hr. 50% NaOH were injected into the flame so produced. The gas issuing from the reaction tower was supplied to a gas scrubbing device and scrubbed therein with a sodium phosphate solution, which was circulated. The resulting scrubbing solution was cooled down to a temperature of 75 to 85° C., in a heat exchanger. A portion of the scrubbing solution so cooled (partial stream) which had a temperature of 80° C. and a pH-value of 2.5, was branched off, and the balance portion was circulated for a mean period of 2 hours to hydrolyze the polyphosphates contained therein. The feed phosphorus contained about 64 p.p.m. (parts per million) arsenic. The dearsenification of the scrubbing solution partial stream, of which the solid matter content assumed a substantially constant value of 375 grams/liter within some hours and which contained 24 p.p.m. arsenic, based on the dissolved solids, was started about 2.5 hours, after operation was started. To this effect, the scrubbing solution was pumped to a precipitation tower through which it travelled downwardly, and metered quantities of a 4 weight percent $Na_2S$-solution were injected through a nozzle into the lowermost third of the tower. The $Na_2S$ was used in a quantity about 7 times the quantity theoretically needed to precipitate the arsenic. The scrubbing solution so treated was conveyed to a sojourn vessel in which it was allowed to stand for about 1.5 hours. During that time, the bulk of colloidal, dissolved $A_2S_3$ was found to precipitate. The filtration which followed produced a water-white filtrate which merely contained 1 p.p.m. arsenic, based on the dissolved solids. 1350 to 1400 liters/hr. of the filtrate so obtained, which had a temperature of 70° C. and a pH-value of 2.5, were repumped to the reaction tower to maintain a temperature of about 675° C. and a steam partial pressure of about 470 mm. mercury therein. The melt removed from the reaction tower was quenched. The yield was 98 weight percent, based on the feed phosphorus.

The melt phosphate obtained ($(NaPO_3)_x$ with 64% $P_2O_5$ therein) contained 7 p.p.m. arsenic. This corresponded to an about 60% reduction of the initial As-content. A comparative experiment was carried out under analogous conditions save that the steam partial pressure prevailing in the reaction tower was maintained at merely 300 to 330 mm. mercury and that the reactor wall was cooled. The resulting melt phosphate contained 12 p.p.m. arsenic.

What is claimed is:

1. In the process for the manufacture of alkali metal polyphosphates form elementary phosphorus, an alkali metal hydroxide or alkali metal carbonate, and a free oxygen-containing gas, by atomizing the alkali metal hydroxide or the alkali metal carbonate in a recation zone, directly into or in the immediate vicinity of a flame produced by burning liquid phosphorus, removing molten reaction product from the reaction zone, supplying gas issuing from the reaction zone to a gas scrubbing zone, and recycling aqueous scrubbing solution obtained in the scrubbing zone to the reaction zone, the aqueous scrubbing solution being freed, prior to recycling it to the reaction zone, from arsenic contained in the volatile issuing gas by treatment of the scrubbing solution with an alkali metal sulfide or hydrogen sulfide, the improvement which comprises providing an acid containing scrubbing solution having a pH-value of ≤3; maintaining said scrubbing solution at a temperature of about 80° C. for a period of at least 60 minutes; then treating the said solution with a sulfide selected from the group consisting of alkali metal sulfides and hydrogen sulfide, said sulfide being an amount of at least 5 times the stiochometric proportion in which arsenic sulfide is precipitated; standing the treated solution for at least one hour and then filtering the solution; and providing in said reaction zone a steam partial pressure of more than 450 mm. mercury by recycling filtrate from said filtration step to said reaction zone.

2. The process of claim 1, wherein, prior to adding the alkali metal sulfide or hydrogen sulfide, a pH-value <3 is established for the scrubbing solution by adding an acid thereto.

3. The process of claim 1, which comprises recycling to the reaction zone a quantity of scrubbing solution sufficient to produce therein a steam partial pressure of more than 480 mm. mercury.

4. The process of claim 2, wherein the pH-value of the scrubbing solution is established by adding phosphoric acid produced from thermally processed phosphorus.

5. The process of claim 1, wherein the scrubbing solution is allowed to stand for 1.5 hours, prior to filtering off the precipitate.

References Cited

UNITED STATES PATENTS

| 3,216,787 | 11/1965 | Koenen et al. | 23—136 X |
| 3,393,043 | 7/1968 | Kribbe et al. | 23—106 |
| 3,438,725 | 4/1069 | Heymer et al. | 23—106 |

FOREIGN PATENTS

| 664,112 | 5/1963 | Canada | 23—107 |
| 1,143,496 | 2/1963 | Germany | 23—107 |

OSCAR R. VERTIZ, Primary Examiner

C. B. RODMAN, Assistant Examiner